United States Patent [19]
Miller

[11] Patent Number: 5,678,826
[45] Date of Patent: Oct. 21, 1997

[54] RETRACTABLE RETAINER AND SEALANT ASSEMBLY METHOD

[75] Inventor: Patrick Lee Miller, Kansas City, Mo.

[73] Assignee: Orbseal, Inc., Excelsior Springs, Mo.

[21] Appl. No.: 566,481

[22] Filed: Dec. 4, 1995

Related U.S. Application Data

[62] Division of Ser. No. 109,969, Aug. 23, 1993, abandoned.
[51] Int. Cl.6 .............................. F16J 9/00; B29B 13/00
[52] U.S. Cl. .............................. 277/1; 277/166; 277/189; 264/275; 264/278; 296/187
[58] Field of Search .............................. 277/12, 166, 189, 277/1; 411/408, 409, 410, 908; 296/187, 205, 209; 264/275, 278, 46.6

[56] References Cited

U.S. PATENT DOCUMENTS

| | | | |
|---|---|---|---|
| 3,139,784 | 7/1964 | Moorman | 411/510 |
| 3,400,182 | 9/1968 | Kolt . | |
| 3,956,549 | 5/1976 | Stoeberl | 428/71 |
| 4,233,878 | 11/1980 | McGauran | 411/510 |
| 4,238,446 | 12/1980 | Tanaka | 411/510 |
| 4,805,366 | 2/1989 | Long | 411/510 |
| 4,898,630 | 2/1990 | Kitoh et al. | 156/79 |
| 4,901,395 | 2/1990 | Semrau | 277/26 |
| 5,040,803 | 8/1991 | Cieslib et al. | 277/12 |
| 5,102,188 | 4/1992 | Yamane | 296/205 |
| 5,160,465 | 11/1992 | Soderberg | 264/46.6 |
| 5,213,391 | 5/1993 | Takagi | 296/205 |
| 5,344,208 | 9/1994 | Bien et al. | 296/187 |

FOREIGN PATENT DOCUMENTS 4110280  4/1992  Japan ...................... 296/187

*Primary Examiner*—Daniel G. DePumpo
*Attorney, Agent, or Firm*—D. D. McGraw

[57] ABSTRACT

A vehicle body pillar has a cavity therein through which air flow creates undesirable noise and in which moisture and fluids such as water are not to be collected. An expandable sealant plug is inserted therein and retained in place by one or more extractable retainers. The sealant material forming the plug is later expanded and cured under controlled conditions, sealing the cavity so as to prevent the flow of air through it. The expanded sealant also effectively blocks the intrusion of fluids such as water, minimizing corrosion within the pillar. The extractable retainers are then removed and permanent retainers used to hold moldings or the like in place. The sealant also seals the permanent retainers. In other instances, the same type of extractable retainers used with the expandable sealant may be used with a hot melt sealant which, when melted, provides sealing for the later-installed permanent fasteners and the apertures through which they extend.

6 Claims, 2 Drawing Sheets

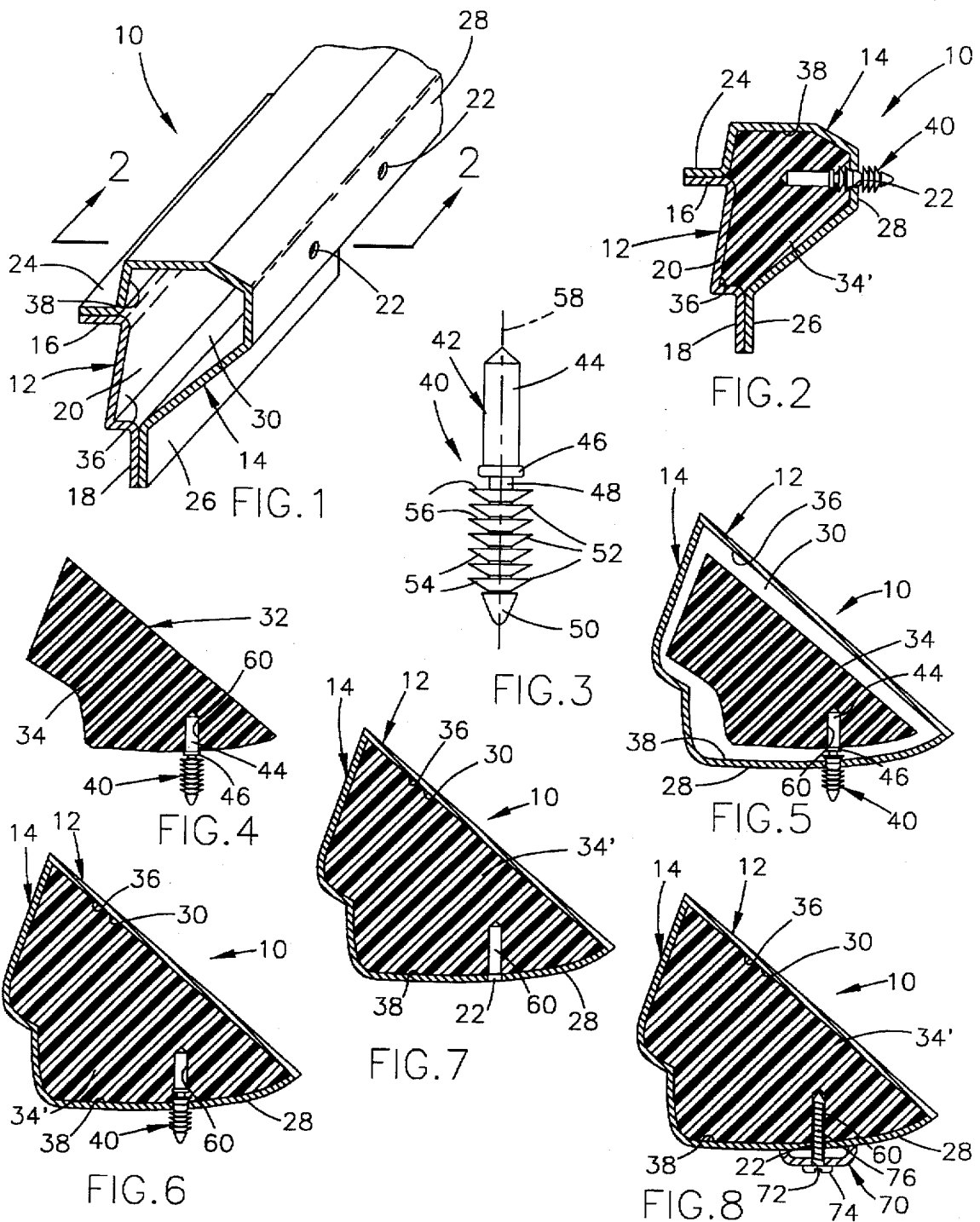

RETRACTABLE RETAINER AND SEALANT ASSEMBLY METHOD

This application is a division of U.S. patent application Ser. No. 08/109,969 now abandoned, filed Aug. 23, 1993, by the same inventor of the invention herein disclosed and claimed, and entitled, "EXTRACTABLE RETAINER AND ASSEMBLY AND METHOD USING SAME".

FIELD OF THE INVENTION

The invention relates to a method for sealing cavities, and more particularly to a method employing a sealant assembly in sealing cavities, in body membered having cavities which at times are subject to air flow therethrough which creates objectionable noises, and are also at times are subject to entry of fluids with resultant deleterious effects. The sealant assembly includes an extractable retainer assembled with a sealant to form the sealant assembly used to seal a cavity in a body member.

The method in one aspect includes the steps of using the extractable retainer sealant assembly to seal a cavity in a body member. As a part of the method, after the cavity is so sealed, the retainer is extracted from the sealant as well as from the body member forming the cavity which is sealed by the sealant, having fulfilled its function of retaining the sealant in place in the cavity to be sealed until the sealant seals the cavity. It also relates to sealing the apertures through which the extractable retainer or retainers and possible later-installed permanent fasteners extend. The invention is particularly applicable to sealing cavities formed when vehicle body parts such as pillars are manufactured.

Various articles of manufacture are made with cavities located in areas where wind and water, for example, can enter, causing undesirable wind-generated noises and increasing the likelihood that the article will rust because of water remaining in the cavities. In an automobile, the pillars which outline parts of the windshield and other windows and provide support to the roof are such articles of manufacture. They also at times have fasteners or retainers holding trim or other similar devices in place on them, and the apertures through which these fasteners or retainers extend are to be sealed against leakage past the fasteners or retainers.

As automobile technology has progressed, the interior of the automobile has become quieter and the automobile occupants are more conscious of noises generated by car movement. One class of these noises is wind-generated noise. There are several sources of such noise, and each has been the subject of preventive measures which minimize the noise. One of the sources of such noise, as recognized in the below noted U.S. Pat. No. 5,040,803, has been found to be the interiors or cavities created when the vehicle body is assembled from various sheet metal parts to form body sections including pillars. These pillars are commonly designated as "A", "B", and "C" pillars. They connect the lower part of the body and the roof, providing the roof support. "A" pillars are those at the front quarters of the passenger compartment on either side of the windshield and immediately forward of the front side doors. "B" pillars are those between the front and rear side doors of typical four door sedans, station wagons and the like. "B" pillars therefore separate the front side windows from the rear side windows. "C" pillars are at the rear quarters of the passenger compartment on either side of the rear window and aft of all of the passenger compartment side doors in the typical two door passenger car or the typical four door sedan.

In recent years these pillars have been made from inner and outer sheet metal panels which fit together so that mating flanges are welded in place to form particular automobile body sections. Most of the complementary panel areas of each pillar are spaced apart to form a hollow space or cavity between the panels. It is this type of void or cavity that has been found to generate such undesirable noises and also to be subjected to deterioration should moisture be trapped therein. The sources of such moisture include rain, snow, car washes, and road moisture which is splattered on the automobile by passing vehicles, particularly trucks. The road moisture is especially undesirable because it often contains rust accelerators such as sodium chloride used to melt ice during colder months in areas where freezing of water on a roadway is a common winter occurrence.

It is therefore desirable to prevent the flow of air through the hollows or cavities of the pillars, and also to prevent water and similar fluids from entering the cavity and flowing through it, coming to rest at various places and causing rust to start.

The struggle against rust has led to the electro-coating of the vehicle body with anti-rust paints or compounds before the assembly of the vehicle has been completed. These paints or compounds are then commonly cured by baking the entire body or body sections in ovens at temperatures and for appropriate set lengths of time which will result in the paints or compounds drying on and adhering to the inside and outside surfaces of the body or body sections. The electro-coating process commonly includes application of the paints or compounds in all cavities and recesses of the body sections, including the pillar hollows or cavities, using electrically charged paints or compounds and electrically oppositely charged target elements. The vehicle body section is such a target element. The baking process, which usually immediately follows the electro-coating process, involves placing the entire body or body section in an oven and heating the entire body or body section to a predetermined temperature for a predetermined period of time. These temperatures and time periods are such that the particular paints or compounds used in coating the body structure, including its cavities and the fastener apertures, are cured in place.

BACKGROUND OF THE INVENTION

The invention is an improvement over the invention disclosed and claimed in U.S. Pat. No. 5,040,803 in which the inventor of the invention herein disclosed and claimed was a co-inventor. That patent issued Aug. 20, 1991, and is entitled, "Cavity Sealing Arrangement and Method." It describes some of the earlier arrangements for introducing sealer in fluid form, whether in the form of a liquid or a powder-like solid which will flow like a liquid, into each of the pillar interior access holes, and the problems with such arrangements. It then discloses and claims a structure and method for using a preformed, heat-expandable, dry sealant to overcome the fluid form sealant problems.

The disclosure of the above-noted U.S. Patent provides the most recent background to the present invention known to the inventor. Because of the related nature of the disclosure of U.S. Pat. No. 5,040,803 and the presently disclosed invention, the complete disclosure of that patent is hereby incorporated herein by reference.

That patent teaches the use of a preformed, shaped sealant plug consisting of a measured amount of expandable sealant material, inserting it into the pillar access aperture communicating with an intermediate portion of the pillar, and retaining it in place before and while it is expanded by applied heat, or by introducing a reaction agent which will cause expansion of the plug under certain conditions. Such a preformed and shaped expandable sealant, with the appropriate retainer, can be installed in the pillar at any stage from the time of assembly of the pillar itself to a point immediately prior to the electro-coat baking operation.

That patent disclosure also recognizes the advantages of employing a dry, preformed, shaped, heat-expandable sealant, mounted and retained in place by a retainer cap which closes the aperture through which the sealant was inserted and remains in place even after the sealant expansion operation is completed. The patent disclosure recognizes the preferred use of a sealant which does not begin its expansion until it is subjected to a temperature well above ambient temperatures encountered before the electro-coat baking operation, but is activated to so expand within an elevated range of temperatures such as that employed during the electro-coat baking operation, and will so expand within the lengths of time such elevated temperatures are present during that operation. The sealant expands only after the baking operation is well underway, and will fill the pillar void or cavity within a predetermined longitudinal section of the cavity located on both sides of the access aperture area where the sealant has been inserted and retained. It does not need or have the fluid flow characteristics previously encountered. The expanded sealant will then provide a block against the deleterious flow of fluids including air and water precisely in the desired area in the cavity irrespective of the orientation of the pillar during heating of the sealant.

SUMMARY OF THE INVENTION

The invention is more particularly addressed to various features including: the provision of an extractable retainer for securing the sealant in place before and during sealant heating; the cooperation of the extractable retainer with the sealant to form an assembly and provide a recess for a final fastener to be inserted into or through the sealant; the provision and use of one or more of the extractable retainers and the sealant as a temporary unitary assembly; the positioning of the sealant and the extractable retainer or retainers within the cavity to be sealed while certain other processes such as anti-corrosion coating and paint coating processes are performed; the final assembly of the sealant in the cavity with the extractable retainer removed; the completed structural assembly in which the sealant has sealed the cavity, or at least the portion thereof adjacent the opening in the cavity wall through which the extractable retainer extends, and the provision for the later installation a permanent retainer extending through the cavity wall opening and into the recess or passageway formed in the final form of the sealant by the extractable retainer when so installed, the permanent retainer being employed to attach an exterior part such as a trim molding or the like to the exterior of the cavity-forming structure, together with the relationship of the part of the permanent retainer extending into the sealed cavity to the sealant, one aspect of the method herein disclosed and claimed is that of accomplishing the initial sealant retention and the removal of the extractable retainer so that the sealed body member is prepared for the ultimate fastening of an external part using a permanent fastener which is inserted into or through the recess formed in the sealant by the initially employed extractable retainer. The method in another aspect may also include the step of installing such an external part using a permanent fastener installed in that manner so that the sealant recess receives the part of the permanent fastener extending through the body aperture into the sealant recess and the sealant continues to seal the aperture.

BRIEF DESCRIPTION OF THE DRAWINGS

FIG. 1 is a perspective view of a section of a vehicle pillar in which the invention is used. The pillar is shown with parts broken away and in section. The sealant and its retainers are not shown in place so that the pillar construction is more clearly seen.

FIG. 2 is a cross section view of the vehicle pillar of FIG. 1, taken in the direction of arrows 2—2 of that FIGURE, with the sealant assembly having been mounted therein before completion of the forming of the pillar, the pillar then having been completed, and the sealant then expanded so as to fill the portion of the cavity in the pillar where the section view is taken. The extractable retainer located on the section line of arrows 2—2 has not yet been removed.

FIG. 3 is an elevation view of an extractable retainer employed in practicing the invention herein disclosed and claimed. Such a retainer is and used to hold the sealant in place before and during sealant expansion and curing.

FIG. 4 is a schematic cross section representation of a piece of preexpanded dry form molded sealant with at least one extractable retainer of the type shown in FIG. 3 in place before the sealant is secured to a part of the pillar before the pillar is completely formed.

FIG. 5 is a schematic cross section representation showing the piece of preexpanded dry form molded sealant and at least one extractable retainer of the type shown in FIG. 3 mounted in place to a part of the pillar with the pillar thereafter having been formed about the sealant.

FIG. 6 is a schematic cross section representation of the disclosure of FIG. 2, showing the piece of form molded sealant after it has been expanded within the pillar cavity to fill that cavity in cross section, and the extractable retainer extending from within the expanded sealant out of the pillar so as to be able to be grasped and removed.

FIG. 7 is a schematic cross section representation of the disclosure of FIG. 2, and is similar to FIG. 6 but shows the pillar and the expanded sealant with the extractable retainer removed, leaving a recess in the expanded sealant.

FIG. 8 is a schematic cross section representation similar to FIG. 7 but showing an external trim molding secured to the pillar by a permanent retainer which extends into the recess left by the removed extractable retainer.

DETAILED DESCRIPTION

Figure 9:
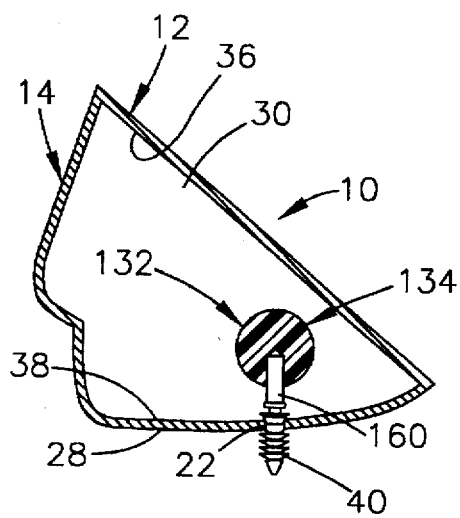
FIG. 9 is a schematic cross section representation similar to FIG. 5 but showing a sealant assembly including hot melt sealant held in position within the pillar cavity by at least one extractable retainer such as the extractable retainer of FIG. 3.
Figure 10:
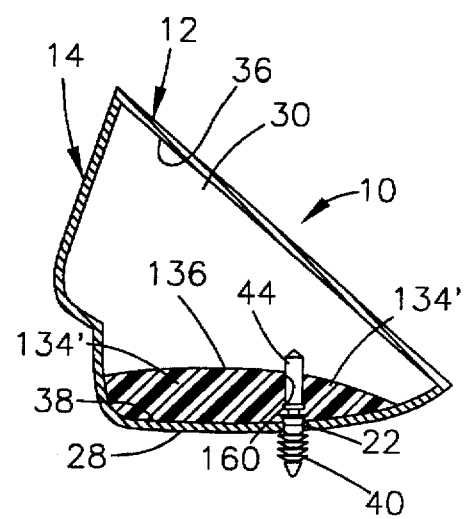
FIG. 10 is a schematic cross section representation similar to FIG. 6 but showing the melted hot melt sealant within the cavity of the pillar and engaging the inner side of a pillar cavity lower wall so as to provide a seal about the pillar wall opening through which the extractable retainer extends.
Figure 11:
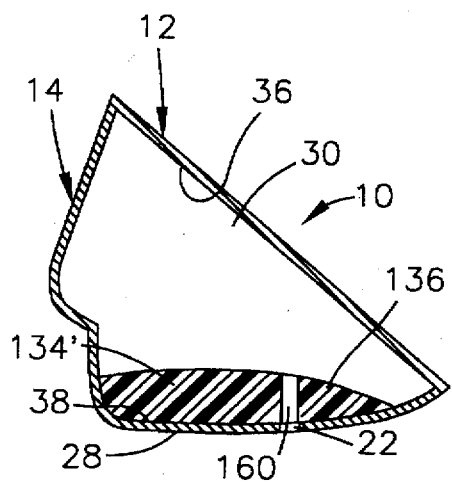
FIG. 11 is a schematic cross section representation similar to FIG. 7 but showing the recess created by removal of the extractable retainer extending through the mass of melted hot melt sealant within the cavity of the pillar.
Figure 12:
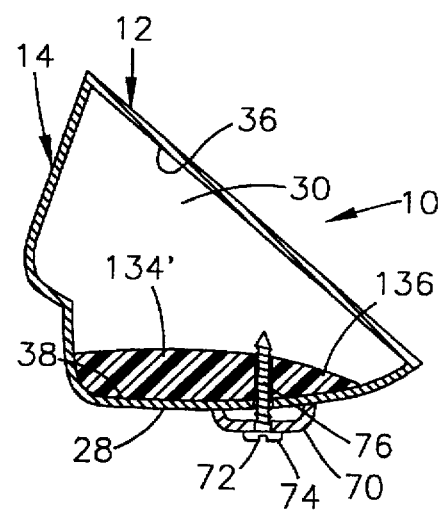
FIG. 12 is a schematic cross section representation similar to FIG. 8 and showing an external molding secured to the pillar by a permanent retainer which extends into the recess left by the removed extractable retainer.

The invention is illustrated as being applied to or practiced in relation to a body member such as a vehicle body pillar 10. It is to be understood that it may also be applied or practiced in relation to other articles of manufacture having cavities requiring sealing and blockage. The portion of the pillar 10 shown in FIG. 1 is the upper portion of the "A" pillar of a typical passenger vehicle body. Pillar 10 is made as a welded sheet metal subassembly formed by the union of a stamped inner panel 12 and a stamped outer panel 14.

Inner panel 12 has generally longitudinally extending flanges 16 and 18 joined by a panel center part 20 of suitable configuration. Outer panel 14 has generally longitudinally extending flanges 24 and 26 joined by a panel center part 28 of suitable configuration. In the preferred embodiment illustrated, a plurality of access apertures 22 are formed in outer panel center part 28 at appropriate positions where the sealant blockage is to be located in the cavity of the pillar. One of the apertures 22 is seen in FIG. 2, with the extractable retainer to be described extending through it. Flanges 16 and 24 and flanges 18 and 26 are respective mating flanges which are placed in full surface engagement as shown in FIGS. 1 and 2. As will be later described, the preexpanded sealant material will have been secured to the stamped outer panel 14 before the inner and outer panels are assembled together. The flanges are then welded together by suitable means such as spot welding to join the stamped inner and outer panels 12 and 14 together and form the pillar subassembly 10. However, FIG. 1 does not show the sealant material or its extractable retainers, so that the pillar construction may be more readily understood. The inner and outer panels 12 and 14 have configurations which provide the desired stiffness and load-carrying characteristics to the pillar 10 and at the same time define the void or cavity 30 extending longitudinally within the pillar 10. Cavity 30 is a longitudinally extending enclosed space, and access apertures 22 open into it through the center part 28 of outer panel 14.

The sealant assembly 32, which is also a subassembly part, is illustrated in FIGS. 2 and 4–6. In FIGS. 2 and 6 it is shown after the sealant plug 34 has been expanded so as to block the cavity 30. The expanded sealant is identified in those FIGURES by the reference character 34'. The sealant in the form of sealant plug 34 is illustrated in FIGS. 4 and 5 before it has been expanded.

The expandable sealant plug 34 of FIGS. 4 and 5 is preferably shaped in cross section much like the cross section shape of the cavity 30, but is substantially smaller in cross section area than that cavity. It extends longitudinally a sufficient distance to span at least slightly beyond the plurality of access apertures 22 through which its extractable retainers will extend. The volume of the preexpanded sealant plug 34 is carefully controlled so as to control the volume of the expanded sealant 34'. If, for example, the sealant will expand eight-fold when heated, the sealant plug 34 is one-eighth of the desired volume of the expanded sealant 34'.

In addition to the sealant plug 34, the preexpanded sealant assembly 32 includes at least one, and preferably a plurality of, extractable retainers 40, one of which is shown in detail in FIG. 3. Typically, two or three such retainers would be used in one sealant assembly, and the same number of apertures 22 would be provided in the outer panel section 28 to receive those retainers. Since the extractable retainers are identical in structure and use, further detailed description will refer to only one of them.

The extractable retainer 40 is preferably made of a relatively hard plastic material which still has sufficient flexibility to be inserted and later removed as described below. A typical example of such material is Nylon. Extractable retainer 40 must withstand the heat of the electro-coat baking process, or other heating process which will expand the sealant, without loss of its retention functions.

Each extractable retainer 40 has a shaft 42 forming the main body of the retainer. Shaft 42 is divided into four definable sections. It is circular and its maximum diameter is no greater than the diameter of the access apertures 22.

The upper end and first section 44 of retainer shaft 42, as oriented in FIG. 3, is a smooth cylinder section terminating in a beveled point. The precise diameter of section 44 is determined by the characteristics and size of the particular permanent retainer later described. The next adjacent and second shaft section 46 is a slightly larger diameter collar, with its maximum diameter preferably the same as, but no larger than, the diameter of the access apertures 22.

The third shaft section 48 is of considerably smaller diameter than the first and second shaft sections 44 and 46. It extends from the opposite side of the second section 46 from the first section 44, may be about as long as the first section, and terminates at the fourth shaft section 50. Shaft section 50 is a conically shaped tapered head which points in the opposite direction from the conical outer end of first section 44, and its maximum diameter is about the same as that of first section 44.

Third shaft section 48 has a plurality of axially spaced, generally laterally extending, flexible branches 52 which give rise to the descriptive term of "Christmas tree retainer" for this retainer. Branches 52 are of larger diameter than the diameter of apertures 22, and are sufficiently flexible to permit insertion of each extractable retainer 30 through an aperture 22, with the fourth shaft section 50 leading, until each extractable retainer 30 is positioned substantially as shown in FIG. 5 relative to the center part 28 of outer panel 14. The branches 52 which have passed through the aperture 22 will flex back to their original configuration as soon as they exit from the aperture. The branches 52 that have not yet entered the aperture will remain in their original configuration. Thus the extractable retainer will hold its axial position relative to the outer panel center part 28. Branches 52 may be circular with beveled surfaces 54 on the one side toward the shaft fourth section 50 as shown, or may be laterally extending segments of such circularly formed and beveled branches. The other side surfaces 56 of the branches 52 may be either substantially perpendicular to the axis 58 of the retainer inwardly beveled so that the branches are effectively conically dished discs or laterally extending segments thereof. In any case, they must be sufficiently flexible to bend inwardly as the retainer is being pushed through its aperture 22 during installation, and later to also flex so that the retainer is completely extracted by pulling it on through its aperture 22 and removing it completely. The reduced diameter of the shaft third section 48 provides sufficient room for the inward flexing of the retainer branches. The beveled surfaces 54 of the branches engage the edge of the aperture 22 as the retainer is being inserted, camming the branches upwardly and inwardly as they flex sufficiently to pass through the aperture. Once through the aperture and have returned to their original shape, the shape of their side surfaces 56 strongly resists the reverse movement of the retainer rather than aiding it.

FIG. 4 illustrates a preexpanded sealant assembly 32 in cross section before it is secured to any part of the pillar 10. The preexpanded sealant 34 is shown schematically, as is the pillar 10 in FIGS. 4–8, for simplicity. The extractable retainer 40 has its first shaft section 44 located in a recess 60. It is inserted into the recess so that the retainer's enlarged collar section 46 engages the open end of the recess, providing an easy gauge for the distance that the retainer is to be inserted. Recess 60 may either be preformed in the sealant 34 or may be formed by forcing the retainer first shaft section 44 into the sealant material at the proper location. The preformed recess is usually preferable. It will be slightly smaller in diameter than the diameter of the first shaft section 44 so that the sealant grips that shaft section to hold the retainer in place after insertion. It also provides more accurate placement of the retainer.

The preexpanded sealant assembly 32 is installed on a panel of the pillar having the access apertures 22 in it before the pillar panels are assembled and fastened together. This installation is quite simple, merely requiring that the extractable retainers have their end sections 50 inserted in the matching access apertures and pushing the assembly toward the panel section having the apertures 22 in it until the sealant 34 is spaced from the panel wall by the desired amount. After the pillar panels have been fastened together, the appearance in cross section is that shown in FIG. 5.

The pillar is usually thereafter assembled with other body parts into a body structure which is to be electro-coated and baked as more fully described in the above noted U.S. Pat. No. 5,040,803.

When the electro-coat baking step of the operation is performed, the electro-coated paint, the body member pillar 10, and the sealant plug 34 are heated to a predetermined temperature and are held at that temperature for a predetermined time. In addition to baking and curing the paint, the heat applied to the sealant plug 34 acts to expand and then cure the sealant within the body member pillar cavity 30. This generates the expanded sealant plug 34' which blocks and seals the body member cavity 30 against deleterious wind noise and water intrusion. The extractable retainers 40 are retained in their respective mounted positions within the access apertures 22 and keep those apertures closed so that the expanding sealant does not expand outwardly through the apertures.

The heat-expandable sealant material forming the preexpanded sealant plug 34 must expand and cure during the paint oven heats to provide the desired seal block in cavity 30. Such sealant preferably has no toxic noxious odor so as to have no adverse effects on personnel. It may expand between about 500% and 1,000% and then be cured when baked within the time range of about 30 minutes to 60 minutes at temperatures ranging from about 275° F. to 400° F. These ranges may be modified to a lesser percentage expansion, with possibly a slightly shorter time limit such as 20 minutes being provided. The important limits are those set by the paint baking times and temperatures, which may change as different paints are used. However, these identified ranges are commensurate with current electro-coated paint baking and curing practice. It is to be understood that the pillar and the preexpanded sealant plug 34 may be heated and cured by other heat sources than the paint baking ovens, but these are already available, produce the requisite temperatures for the requisite times, and require no additional energy or equipment.

The sealant 34' should permit no evidence of corrosion between the expanded sealant 34' and the cavity walls 36 and 38, even after one week of applied salt spray, three weeks at 100° F. and 100% humidity, a cyclic thermal stress, or high temperature exposure up to 400° F. for one hour. There should be no brittleness or cracking of the expanded sealant when it is aged for two weeks at 70° C. It should be sufficiently stable that no deleterious effect occurs after being held at a temperature of 54° C. for seventy-two hours. It should withstand at least two impacts of fifteen inch-pounds at −29° C. without cracking or loss of adhesion. It should have less than 5% water absorption, and preferably under 2%. It must be compatible with the electro-coated paint process when it is to be expanded during the baking and curing step of that process. It must not be flammable with a minimum of 50 passes of an open flame across it.

Such a sealant is produced by the Orbseal Corporation of Moberly, Mo. and identified by Orbseal specification 136.2. It is a highly expandable dry sealant material which may be molded into suitable shapes and lengths such as preexpanded sealant plug 34.

The heat of baking causes the sealant 34 to expand to fill at least the cross section area of the cavity 30 in which it is located, so that the preexpanded sealant 34 becomes the expanded sealant 34' of FIGS. 6–8. The expanded sealant 34' may also expand outwardly along the length of adjacent portions of the cavity 30, with the amount of such expansion depending on the amount of preexpanded sealant material used and the percentage of sealant expansion achieved.

FIGS. 2 and 6 show this expansion step having been completed, with the extractable retainers 40, one of which is seen in that cross section view, remaining in place. The expanded sealant 34' has contacted the inner walls 36 and 38 of the pillar 10, and has expanded around those portions of the retainers 40 which extended between the panel surface and the preexpanded sealant 34 in FIG. 5.

The pillar may be left in this condition for a time, or not. Whenever thereafter desired, the extractable retainers 40 may be removed by gripping their sections 48 and 50 and simply pulling them out through the apertures 22. Simple gripping tools such as pliers or even the hands may be used to remove these retainers. This will leave the recesses 60, one of which is shown in FIG. 7, in position in alignment with the access apertures 22. The extractable retainers may be reused several times, depending upon the amount of wear and tear on them during installation and removal. When it is desired to attach a structure such as molding 70 to the exterior of the pillar panel section wall 28, the molding, which has apertures 72 formed in it which correspond to the apertures 22, is laid in place and the permanent retainers 74 are inserted through the molding apertures 72, the access apertures 22 and into the recesses 60. Since the recesses 60 are smaller in diameter than the shanks 76 of the permanent retainers 74, the shanks are also sealed. The permanent retainer shanks 76 may be any of several types, such as having screw threads or of a bayonet type. However they are constructed, they also grip the edges of the apertures 22 to maintain a strong securing action for the molding 70.

In many instances automobile pillars as well as other structures may have other apertures provided for the insertion of fasteners or retainers for moldings and the like, located in areas whether it is either unnecessary or undesirable to use the preexpanded sealant plug 34 which expands under heat to fill the entire cross section of the cavity. In such instances, instead of using the preexpanded sealant plug 34, a hot melt sealant may be used. This arrangement is shown in FIGS. 9–12. FIG. 9 is comparable to FIG. 6, but with a section of hot melt sealant 134 secured to one or more extractable retainers 40 to form assembly 132. Sealant 134 does not have to be expandable, but must melt under heat of the paint baking oven or other suitable heating equipment for the purpose of melting the sealant. In this instance, the inner wall 38 of the panel center part 28 must be substantially level so that when the hot melt sealant melts it assumes the position shown in FIG. 10. When it is desired that the recess 160 in the melted hot melt sealant 134' extend entirely through the melted sealant, the quantity of hot melt sealant is controlled so that the melted sealant 134' will assume its melted and then cured position with its upper surface 136 below the upper end of the extractable retainer first section 44. Of course, if it is not desired that the recess 160 extend entirely through the melted sealant 134', sufficient sealant is used to cover the upper end of extractable retainer 40, providing a closed recess instead of an open through-passage recess.

The extractable retainer or retainers 40 perform their functions as before, and after the melted sealant 134' is cured, they may be removed and permanent retainers 74 may be attached, holding a molding 70 or the like in position. The melted sealant will keep the apertures 22 sealed, as well as the shanks 76 of the permanent retainers 74.

I claim:

1. A method of sealing a body member cavity against deleterious wind noise and fluid intrusion, said method comprising the steps of:
    (a) forming a shaped, heat-expandable sealant plug to a definitive form having recesses adapted to receive ends of extractable retainers so that the retainer ends are held in place relative to the sealant plug;
    (b) inserting one end of each of the extractable retainers in one of the recesses of the so-formed plug so that the retainer ends are held in place relative to the sealant plug;
    (c) inserting the extractable retainers into and through mating body member apertures before the body member is closed during fabrication to create the cavity;
    (d) thereafter completing fabrication of the body member so as to create the cavity so that the other ends of the extractable retainers extend outwardly from the body member and the sealant plug is supported within the cavity;
    (e) heating the body member and the sealant plug to a predetermined temperature and holding them substantially at that temperature for a predetermined time, the heat applied to the sealant plug for the predetermined time acting thereon to expand the sealant plug within the body member cavity and generate an expanded sealant plug which blocks and seals the body member cavity against deleterious wind noise and water intrusion and is cured;
    (f) retaining the extractable retainer in mounted position within the body cavity aperture so that it keeps the aperture closed with respect to the expanding sealant plug throughout the plug's expansion and curing; and
    (g) thereafter pulling the extractable retainers on through the apertures and replacing them with permanent retainers which extend through the body member apertures and the expanded plug recesses in sealing and secured relation.

2. A method of sealing a body member cavity against deleterious fluid intrusion, said method comprising the steps of:
    (a) forming a shaped, hot melt sealant plug to a definitive form having recesses adapted to receive ends of extractable retainers so that the retainer ends are held in place relative to the sealant plug;
    (b) inserting one end of each of the extractable retainers in one of the recesses of the so-formed plug so that the retainer ends are held in place relative to the sealant plug;
    (c) inserting the extractable retainers into and through mating body member apertures before the body member is closed during fabrication to create the cavity;
    (d) thereafter completing fabrication of the body member so as to create the cavity so that the other ends of the extractable retainers extend outwardly from the body member and the sealant plug is supported within the cavity by the extractable retainers;
    (e) heating the body member and the sealant plug to a predetermined temperature and holding them substantially at that temperature for a predetermined time, the heat applied to the sealant plug for the predetermined time acting thereon to melt the sealant plug within the body member cavity and generate a cured melted sealant plug which blocks and seals the portion of the body member around the extractable retainers and adjacent to the apertures against water intrusion;
    (f) retaining the extractable retainers in mounted position within the body cavity aperture so that they keep the apertures closed with respect to the melting sealant plug throughout the plug's melting and curing; and
    (g) thereafter pulling the extractable retainers on through the apertures and replacing them with permanent retainers which extend through the body member apertures and the cured plug recesses in sealing and secured relation.

3. A method of sealing a body member cavity against deleterious wind noise and fluid intrusion, said method comprising the steps of:
    (a) providing a heat-responsive sealant plug in a definitive form having a recess adapted to receive the inner end of an extractable retainer so that the retainer inner end is held in place relative to the sealant plug;
    (b) inserting the outer end of the extractable retainer in the recess of the so-formed plug so that the retainer inner end is held in place relative to the sealant plug;
    (c) inserting the extractable retainer into and through a mating body member aperture before the body member is closed during fabrication to create the cavity;
    (d) thereafter completing fabrication of the body member and thereby creating the cavity so that the outer end of the extractable retainer extends outwardly from the body member and the sealant plug is supported within the cavity;
    (e) heating the body member and the sealant plug to a predetermined temperature and holding them substantially at that temperature for a predetermined time, the heat applied to the sealant plug for the predetermined time acting thereon to modify the sealant plug within the body member cavity and generate a modified sealant plug which blocks and seals at least a substantial portion of the body member cavity and is cured;
    (f) retaining the extractable retainer in mounted position within the body cavity aperture so that it keeps the aperture closed with respect to the expanding sealant plug throughout the plug's heat-modification and curing;
    (g) thereafter extracting the extractable retainer through the aperture; and (h) thereafter replacing the extracted retainer with a permanent retainer which extends through the body member aperture and the sealant plug recess in sealing and secured relation.

4. The method of claim 3 in which the modification of the sealant plug by heat as set forth in step (e) is accomplished by expanding the sealant plug within the body member cavity and generating an expanded sealant plug which blocks and seals the body member cavity against deleterious wind noise and water intrusion and is cured.

5. The method of claim 3 in which the modification of the sealant plug by heat as set forth in step (e) is accomplished by the step of melting the sealant plug within the body member cavity and generating a molten sealant plug which seals the recess in which the extractable retainer outer end is mounted, blocking and sealing that recess and at least a part of the body member cavity against deleterious fluid intrusion and is cured.

6. A method of sealing a body member cavity against deleterious fluid intrusion, said method comprising the steps of:

(a) forming a shaped, hot melt sealant plug to a definitive form having a recess adapted to receive the inner end of an extractable retainer;

(b) inserting the inner end of an extractable retainer in the recess of the so-formed plug so that the retainer inner end is held in place relative to the sealant plug;

(c) inserting the extractable retainer into and through a mating body member aperture before the body member is closed during fabrication to create the cavity;

(d) thereafter completing fabrication of the body member so as to create the cavity so that the outer end of the extractable retainer extends outwardly from the body member and the sealant plug is held in a desired position within the cavity by the extractable retainer;

(e) heating the body member and the sealant plug to a predetermined temperature and holding them substantially at that temperature for a predetermined time, the heat applied to the sealant plug for the predetermined time acting thereon to modify the sealant plug by melting it within the body member cavity and also acting to generate a cured melted sealant plug which blocks and seals the portion of the body member around the extractable retainer and adjacent to the body member aperture against water intrusion;

(f) retaining the extractable retainer in mounted position within the body cavity aperture so that they keep the apertures closed with respect to the melting sealant plug throughout the plug's melting and curing set forth in step (e) above;

(g) thereafter removing the extractable retainer from the melted and cured sealant plug and from the body member by extracting it through the aperture; and (h) thereafter replacing the extracted retainer with a permanent retainer which extends through the body member aperture and into the cured plug recess in sealing and secured relation.

* * * * *